United States Patent
Baba et al.

(10) Patent No.: US 10,753,398 B2
(45) Date of Patent: Aug. 25, 2020

(54) POWER TRANSMISSION DEVICE FOR VEHICLE

(71) Applicant: TOYOTA JIDOSHA KABUSHIKI KAISHA, Toyota-shi, Aichi-ken (JP)

(72) Inventors: Shinichi Baba, Toyota (JP); Toru Shibamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/526,423

(22) Filed: Jul. 30, 2019

(65) Prior Publication Data

US 2020/0080595 A1   Mar. 12, 2020

(30) Foreign Application Priority Data

Sep. 10, 2018  (JP) .................................. 2018-168995

(51) Int. Cl.
*F16C 19/08*    (2006.01)
*F16C 33/66*    (2006.01)
(Continued)

(52) U.S. Cl.
CPC ...... *F16C 33/6659* (2013.01); *B60B 27/0005* (2013.01); *F16C 19/08* (2013.01);
(Continued)

(58) Field of Classification Search
CPC ...... F16C 19/08; F16C 19/38; F16C 33/6607; F16C 33/6659; F16C 33/6681; F16C 33/6637; F16C 35/04; F16C 35/063; F16C 2240/80; F16C 2326/06; F16C 33/6677; B60B 27/001; B60B 27/0005;
(Continued)

(56) References Cited

U.S. PATENT DOCUMENTS 2,312,361 A  *  3/1943  Sanford .................. B60B 37/10
                                              384/589
3,042,145 A  *  7/1962  Bixby ................. F16H 57/0482
                                              184/6.12
(Continued)

FOREIGN PATENT DOCUMENTS

DE   102017127427 B3  *  4/2019  ............ B60B 27/00
GB       386710 A     *  1/1933  ............ B60B 37/10
(Continued)

*Primary Examiner* — Marcus Charles
(74) *Attorney, Agent, or Firm* — Oliff PLC

(57) ABSTRACT

A power transmission device for a vehicle includes a support member; a first bearing rotatably supporting a first rotation shaft with respect to the support member; a second bearing, provided adjacent to the first bearing, rotatably supporting a second rotation shaft with respect to the support member, the second rotation shaft being rotated around an axis line same as an axis line of the first rotation shaft; and a partition wall formed in the support member and including a notch. Further, the support member includes an oil gallery to supply lubricating oil into a space formed between the first bearing and the second bearing, the space is partitioned into a first space on a side of the first bearing and a second space on a side of the second bearing by the partition wall, and the oil gallery is formed to eject the lubricating oil toward the notch.

2 Claims, 4 Drawing Sheets

(51) Int. Cl.
*F16C 35/06* (2006.01)
*F16C 35/063* (2006.01)
*B60B 27/00* (2006.01)

(52) U.S. Cl.
CPC ........ *F16C 33/6677* (2013.01); *F16C 35/063* (2013.01); *F16C 2326/06* (2013.01)

(58) Field of Classification Search
CPC .. F16H 57/047; F16H 25/162; F16H 57/0471; F16D 25/18
USPC ....... 384/462, 472–473, 474, 490, 504, 520; 184/101, 104.1
See application file for complete search history.

(56) References Cited

U.S. PATENT DOCUMENTS

| | | | | |
|---|---|---|---|---|
| 4,037,694 | A * | 7/1977 | Keese | B60T 1/062 |
| | | | | 192/221.1 |
| 6,250,431 | B1 * | 6/2001 | Dunn | B60T 1/065 |
| | | | | 188/18 A |
| 9,739,238 | B2 * | 8/2017 | Annati | F01D 25/16 |
| 2007/0242913 | A1 * | 10/2007 | Kawaguchi | F16C 19/182 |
| | | | | 384/504 |
| 2017/0067512 | A1 | 3/2017 | Nakawatari et al. | |

FOREIGN PATENT DOCUMENTS

| | | | | |
|---|---|---|---|---|
| GB | 419128 A | * | 11/1934 | ............. B61F 15/14 |
| JP | 2013154697 A | * | 8/2013 | ............. F16C 33/64 |
| JP | 2017-025985 A | | 2/2017 | |
| JP | 2017-053385 A | | 3/2017 | |

* cited by examiner

POWER TRANSMISSION DEVICE FOR VEHICLE

CROSS-REFERENCE TO RELATED APPLICATION(S)

The present application claims priority to and incorporates by reference the entire contents of Japanese Patent Application No. 2018-168995 filed in Japan on Sep. 10, 2018.

BACKGROUND

The present disclosure relates to a power transmission device for a vehicle.

For example, Japanese Laid-open Patent Publication No. 2017-053385 discloses a power transmission device for a vehicle in which a first bearing (ball bearing 54) that supports a first rotation shaft (second rotor shaft 28) rotatably with respect to a support member (case 19) and a second bearing (ball bearing 56) that supports a second rotation shaft (reduction shaft 26), which is rotated around an axis line same as that of the first rotation shaft, rotatably with respect to the support member are arranged adjacently to each other, and an oil gallery for supplying lubricating oil into a space that is formed between the first bearing and the second bearing is formed in the support member.

SUMMARY

There is a need for providing a power transmission device for a vehicle in which bearings and fitting portions for the bearings can be lubricated favorably.

According to an embodiment, a power transmission device for a vehicle includes: a support member; a first bearing rotatably supporting a first rotation shaft with respect to the support member; a second bearing, provided adjacent to the first bearing, rotatably supporting a second rotation shaft with respect to the support member, the second rotation shaft being rotated around an axis line same as an axis line of the first rotation shaft; and a partition wall that is formed in the support member and includes a notch. Further, the support member includes an oil gallery to supply a lubricating oil into a space formed between the first bearing and the second bearing, the space is partitioned into a first space on a side of the first bearing and a second space on a side of the second bearing by the partition wall, and the oil gallery is formed to eject the lubricating oil toward the notch.

DETAILED DESCRIPTION

In the power transmission device for a vehicle disclosed in above-described Japanese Laid-open Patent Publication No. 2017-053385, the lubricating oil supplied from the oil gallery is stirred by the first bearing (specifically, a retainer of the first bearing), and the stirred lubricating oil is further stirred by the second bearing (specifically, a retainer of the second bearing). Thereby, the lubricating oil is stirred too much to generate air bubbles therein. Thus, an oil film forming property of the lubricating oil is degraded by the air bubbles, thereby causing a problem that a friction is generated in narrow spaces in the respective bearings, fitting portions, to which the respective bearings are fitted and the like.

In view of, for example, the above problem, a power transmission device for a vehicle according to an embodiment of the present disclosure will be described with reference to the accompanying drawings. Note that the present disclosure is not limited to the following embodiment. In addition, in the below-described embodiment, note that a constituent that can be replaced by a person skilled in the art and is easy or a constituent that is substantially the same is within a scope of the present disclosure.

Figure 1:
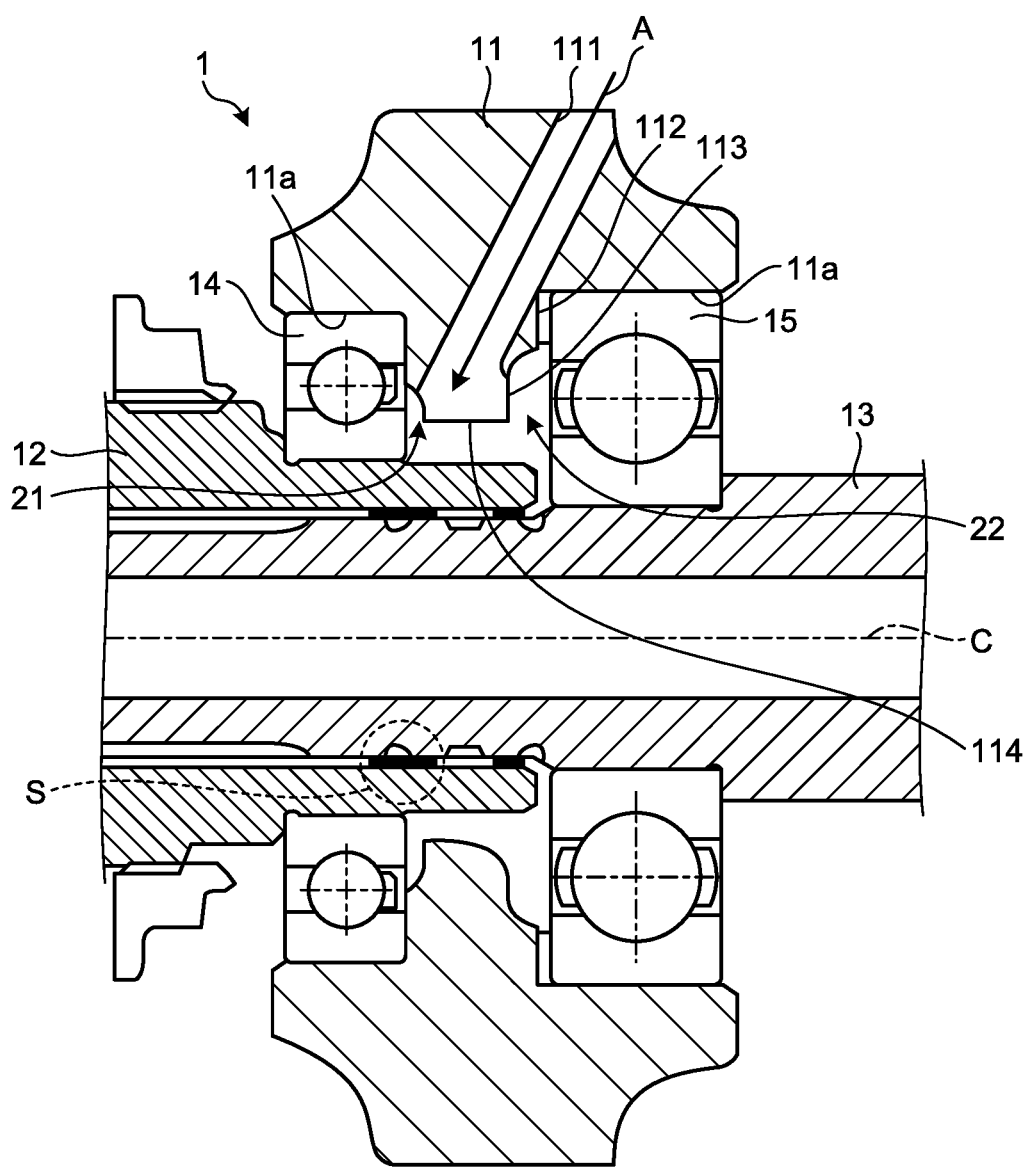
FIG. 1 is a view schematically illustrating a configuration of a power transmission device for a vehicle according to an embodiment of the present disclosure.
Figure 2:
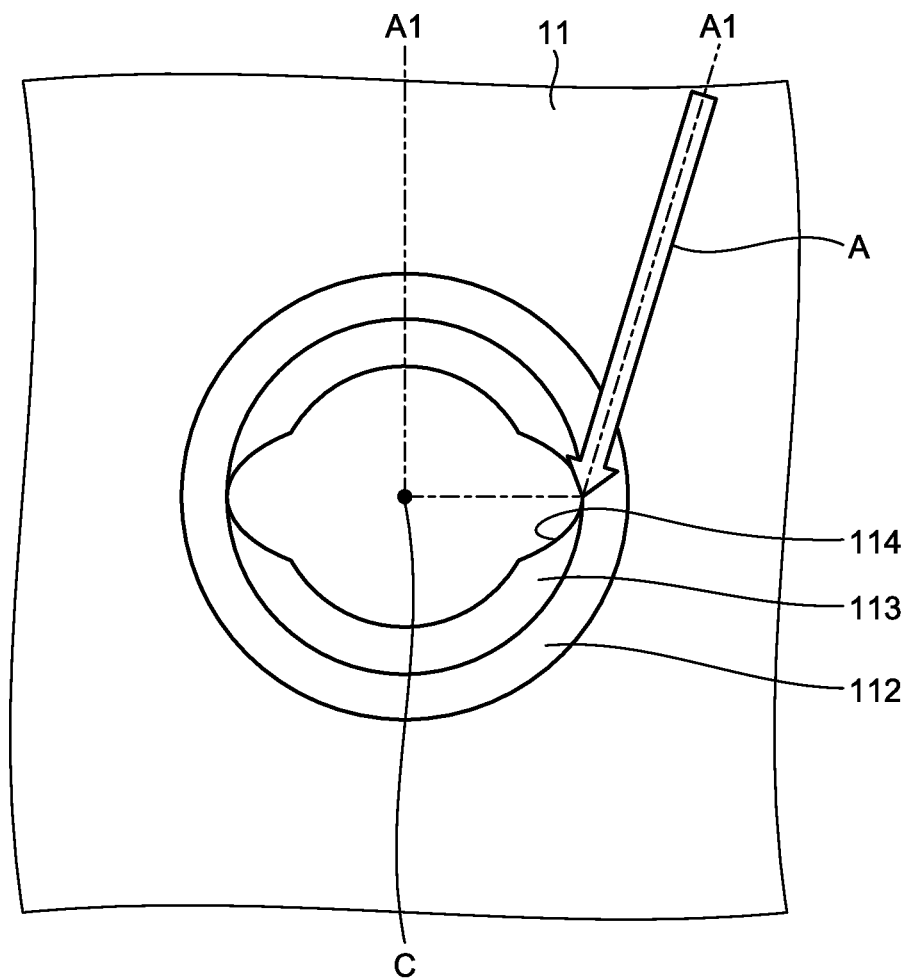
FIG. 2 is a front view schematically illustrating a configuration of a support member in the power transmission device for a vehicle according to the embodiment of the present disclosure.

The power transmission device for a vehicle 1 according to the embodiment is mounted on, for example, a hybrid car and includes a support member 11, a first rotation shaft 12, a second rotation shaft 13, a first bearing 14 and a second bearing 15, as illustrated in FIG. 1. Note that FIG. 1 schematically illustrates a state of the power transmission device for a vehicle 1 that is cut along a line A1-A1 of FIG. 2. In addition, arrows A in FIGS. 1 and 2 represent a flowing (direction) of lubricating oil.

Specifically, the support member 11 is a case that stores the first rotation shaft 12 and the second rotation shaft 13. Into this case, a lubricating oil is injected. Further, in the support member 11, an oil gallery 111 is formed, which is for supplying the lubricating oil into a space that is formed between the first bearing 14 and the second bearing 15. This oil gallery 111 is formed to be inclined with respect to a radial direction of the first bearing 14 which is perpendicular to an axis line C. Moreover, the oil gallery 111 is formed in the support member 11 so as to eject the lubricating oil toward a below-described notch 114, as shown by an arrow A in FIG. 1. Incidentally, the support member 11 has a facing surface 112 that faces an outer ring of the second bearing 15.

In the support member 11, a partition wall 113 is provided. This partition wall 113 is provided in the space between the first bearing 14 and the second bearing 15 so as to protrude into the space. That is, the partition wall 113 is formed to project toward an inside of the radial direction between the first bearing 14 and the second bearing 15. By providing such a partition wall 113 in the space between the first bearing 14 and the second bearing 15, the space between the first bearing 14 and the second bearing 15 is partitioned into a first space 21 that is a space on a side of the first bearing 14 and a second space 22 that is a space on a side of the second bearing 15.

As described above, by providing the partition wall 113 in the support member 11 so as to partition the space between the first bearing 14 and the second bearing 15 into two, the first bearing 14 stirs only lubricating oil in the first space 21 and the second bearing 15 stirs only lubricating oil in the second space 22. Accordingly, the lubricating oil that is stirred by one of the first bearing 14 and the second bearing 15 is inhibited from being further stirred by the other bearing, whereby a generation of air bubbles can be suppressed.

The first rotation shaft 12 is specifically a rotor shaft of an electric motor which is not illustrated. Further, the second rotation shaft 13 is specifically a reduction shaft. The first rotation shaft 12 and the second rotation shaft 13 are rotated around the same axis line C. Further, the first rotation shaft 12 and the second rotation shaft 13 are connected with each other via a spline fitting part S.

The first bearing 14 is, for example, a ball bearing, and rotatably supports the first rotation shaft 12 with respect to the support member 11. Specifically, the first bearing 14 includes an inner ring and an outer ring, the inner ring being fit to an outside of an outer peripheral surface of the first rotation shaft 12, the outer ring being fit to an inside of an inner peripheral surface 11a of the support member 11. The first bearing 14 and the second bearing 15 are arranged adjacently to each other, and are specifically arranged along a direction of the axis line C so as to face each other.

The second bearing 15 is, for example, a ball bearing, and rotatably supports the second rotation shaft 13 with respect to the support member 11. Specifically, the second bearing 15 includes an inner ring and an outer ring, the inner ring being fit to an outside of an outer peripheral surface of the second rotation shaft 13, the outer ring being fit to the inside of the inner peripheral surface 11a of the support member 11.

In the above-described partition wall 113, the notches 114 are provided. Each of the notches 114 is provided to have an arc shape in a part of the partition wall 113 as illustrated in FIG. 2. In FIG. 2, the two notches are provided at positions that are rotationally symmetrical with each other with respect to the axis line C. Further, the notch 114 is provided according to a position of a discharge port which is at a lowermost end of the oil gallery 111, as illustrated in FIG. 1.

Figure 3:
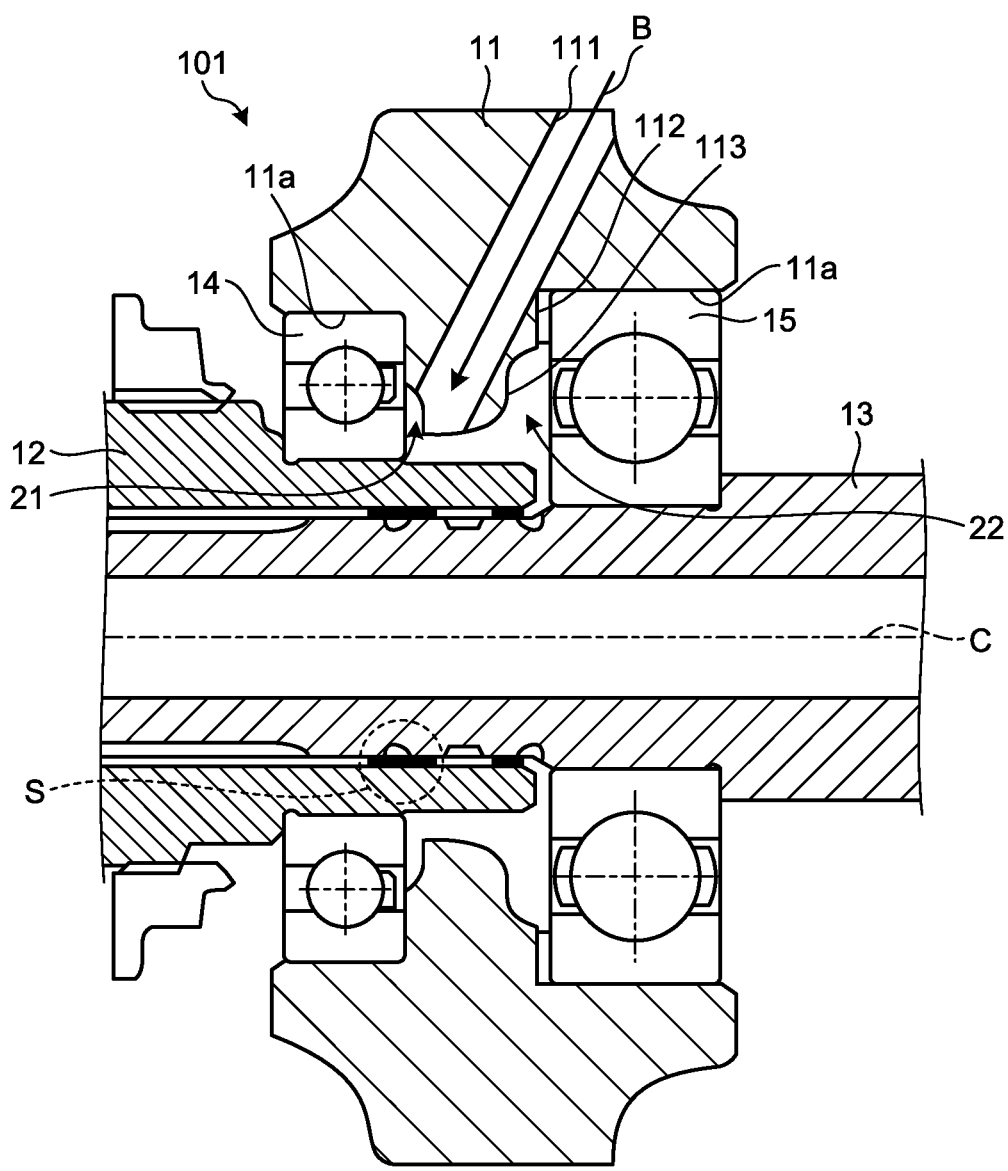
FIG. 3 is a view schematically illustrating a configuration of the power transmission device for a vehicle in which no notch is provided on a partition wall.
Figure 4:
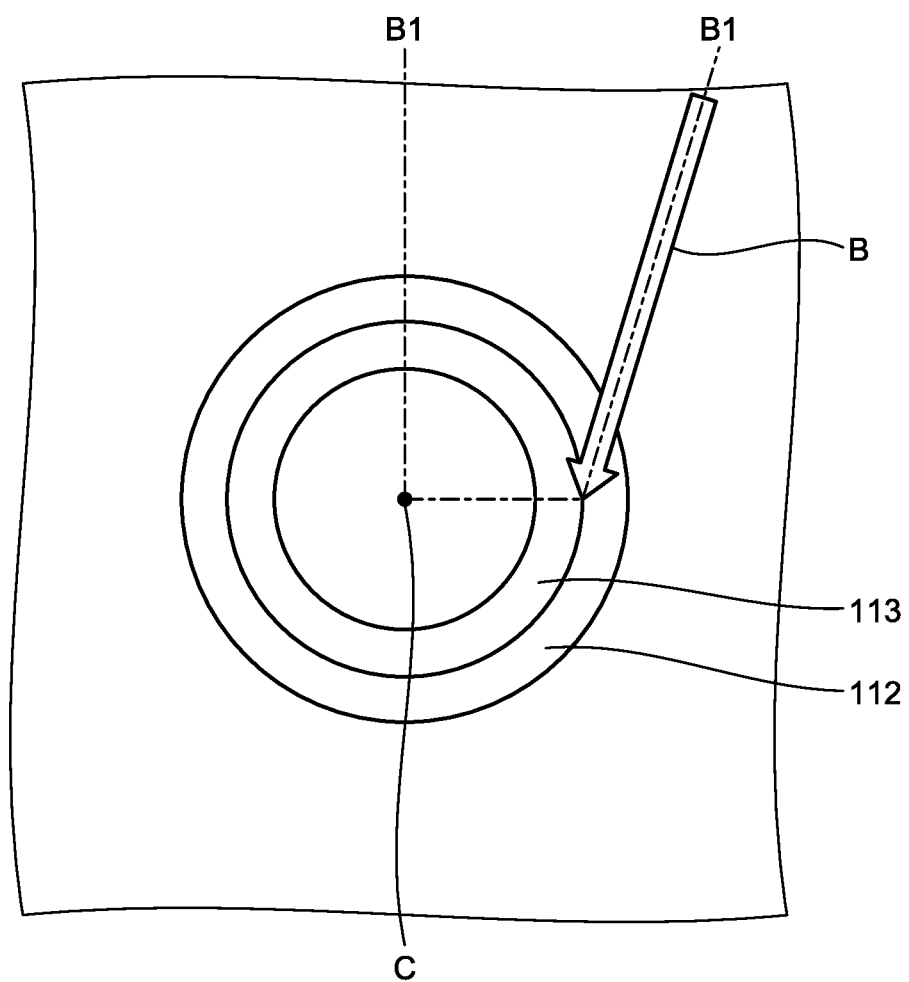
FIG. 4 is a front view schematically illustrating a configuration of the support member in which no notch is provided in the partition wall.

For example, in the case where only the partition wall 113 is provided in the support member 11 in the power transmission device for a vehicle 101 illustrated in FIGS. 3 and 4, the first space 21 and the second space 22 can be formed by the partition wall 113, thereby not causing a problem that the lubricating oil stirred by one of the first bearing 14 and the second bearing 15 is further stirred by the other bearing.

However, by providing the partition wall 113, the space between the first bearing 14 and the second bearing 15 is decreased, so that a path for supplying the lubricating oil becomes smaller. Further, since an angle and a position of the oil gallery 111 are limited, for example, as illustrated in FIG. 3, the oil gallery 111 is formed to be inclined toward one of the spaces (toward the first space 21 in the figure). Accordingly, in the case where only the partition wall 113 in the support member 11 is provided, a new problem may be caused, in which the supply of the lubricating oil is biased to the first space 21, that is, to the side of the first bearing 14. Herein, note that FIG. 3 schematically illustrates a state of the power transmission device for a vehicle 101 cut along a line B1-B1 in FIG. 4. In addition, arrows B in FIGS. 3 and 4 represent a flow of the lubricating oil.

Then, in the power transmission device for a vehicle 1 according to the embodiment, by providing the notch 114 in the partition wall 113 and forming the oil gallery 111 to eject the lubricating oil toward the notch 114, the lubricating oil ejected from the oil gallery 111 can be distributed to the first space 21 and the second space 22, that is, to the first bearing 14 and the second bearing 15, respectively.

Note that a shape and a size of the notch 114 are not limited to those illustrated in FIG. 2. However, if the size of the notch 114 is too large, a region of the partition wall 113 is decreased accordingly, so that the stirring of the lubricating oil between the first bearing 14 and the second bearing 15 may recur. Thus, preferably, the notch 114 has a size that can suppress the stirring of the lubricating oil between the first bearing 14 and the second bearing 15.

Further, by changing the positions of the two notches 114 on a same circumference illustrated in FIG. 2, amounts of the lubricating oil to be distributed to the first bearing 14 and the second bearing 15 can be changed. Moreover, if an amount of the lubricating oil supplied from the oil gallery 111 is increased, the first space 21 and the second space 22 are filled with the lubricating oil, whereby the first bearing 14, the second bearing 15 and the fitting portions for the first bearing 14 and the second bearing 15 can be lubricated.

According to the power transmission device for a vehicle 1 according to the present embodiment as described above, the space formed between the first bearing 14 and the second bearing 15 is partitioned into the first space 21 and the second space 22 by the partition wall 113 that is provided in the support member 11, whereby the lubricating oil that is stirred by one of the first bearing 14 and the second bearing 15 is inhibited from being further stirred by the other bearing.

Further, according to the power transmission device for a vehicle 1, the lubricating oil is ejected from the oil gallery 111 toward the notch 114 that is provided in the partition wall 113, thereby preventing the lubricating oil from the oil gallery 111 from being biased to either of the first space 21 and the second space 22. Thereby, according to the power transmission device for a vehicle 1, the first bearing 14, the second bearing 15 and the fitting portions for the first bearing 14 and the second bearing 15 can be lubricated favorably.

As described above, the power transmission device for a vehicle according to the present disclosure has been explained concretely by way of the mode for carrying out the disclosure, but the gist of the present disclosure is not limited to this description, and shall be interpreted broadly based on the description of the claims. Also, it is needless to say that various changes and modifications based on this description are included in the gist of the present disclosure.

According to the power transmission device for a vehicle according to the present disclosure, since the lubricating oil stirred by one of the bearings is inhibited from being further stirred by the other bearing, and the biased supply of the lubricating oil from the oil gallery to either of the first space and the second space is inhibited, the bearings and the fitting portions for the bearings can be lubricated favorably.

In the power transmission device for a vehicle according to the present disclosure, the space formed between the first bearing and the second bearing is partitioned into the first space and the second space by the partition wall that is provided in the support member, whereby the lubricating oil stirred by one of the first bearing and the second bearing can be inhibited from being further stirred by the other bearing. Moreover, the lubricating oil is ejected from the oil gallery toward the notch that is provided in the partition wall, thereby inhibiting biased supply of the lubricating oil from the oil gallery to either of the first space and the second space.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission device for a vehicle, the power transmission device comprising:
   a support member;
   a first bearing configured to rotatably support a first rotation shaft with respect to the support member;

a second bearing, adjacent to the first bearing, configured to rotatably support a second rotation shaft with respect to the support member, the second rotation shaft being configured to rotate around an axis line the same as an axis line of the first rotation shaft; and a partition wall that is in the support member and that includes a notch, wherein the support member includes an oil gallery configured to supply a lubricating oil into a space between the first bearing and the second bearing, the space is partitioned by the partition wall into a first space on a side of the first bearing and a second space on a side of the second bearing, the notch is a cut out that increases a distance from part of the partition wall to an axis of the first rotation shaft, and the oil gallery is formed to eject the lubricating oil toward the notch.

2. The power transmission device for a vehicle according to claim 1, wherein the oil gallery is communicated with the first space and the second space via the notch.

* * * * *